(12) United States Patent
Grader et al.

(10) Patent No.: US 6,869,563 B2
(45) Date of Patent: Mar. 22, 2005

(54) METHOD FOR PREPARATION OF BULK SHAPED FOAM ARTICLES

(75) Inventors: Gideon Grader, Israel (IL); Gennady Shter, Israel (IL)

(73) Assignee: Cellaris Ltd. (IL)

( * ) Notice: Subject to any disclaimer, the term of this patent is extended or adjusted under 35 U.S.C. 154(b) by 19 days.

(21) Appl. No.: 10/271,054

(22) Filed: Oct. 14, 2002

(65) Prior Publication Data

US 2004/0070096 A1 Apr. 15, 2004

(51) Int. Cl.⁷ .............................. B28B 1/26; B28B 3/00
(52) U.S. Cl. ....................................... 264/628; 264/669
(58) Field of Search ........................... 264/42, 628, 669

(56) References Cited

U.S. PATENT DOCUMENTS 5,498,382 A * 3/1996 Seitz et al. ...................... 264/6
5,624,604 A * 4/1997 Yasrebi et al. ................. 516/88
6,156,430 A * 12/2000 Weber et al. ................ 428/403

* cited by examiner

Primary Examiner—Christopher A. Fiorilla
(74) Attorney, Agent, or Firm—Greenberg Traurig LLP; Eugene C. Rzucidlo

(57) ABSTRACT

A process for the preparation of bulk foams which comprises contacting ceramic foam particles with a hydrophobic material to form impregnated and/or coated ceramic foam particles with hydrophobic properties. The impregnated and/or coated ceramic foam particulate material is mixed with a ceramic binding material with or without an organic binder in an aqueous composition solution to form a castable and pressable mixture. The castable and pressable mixture is cast, and optionally pressed, in a mold to form a wet green body, which is in turn dried to form a dried green body, and is then fired and sintered to form a bulk shape foam article.

3 Claims, 2 Drawing Sheets

METHOD FOR PREPARATION OF BULK SHAPED FOAM ARTICLES

FIELD OF THE INVENTION

This invention is directed to the production of bulk shaped ceramic foam articles utilizing as starting materials ceramic foam. Ceramic foam particles are impregnated with hydrophobic materials and mixed with a aqueous ceramic binder suspension to form castable and pressable mixtures. The castable and pressable mixtures are shaped into useful articles such as, inter alia, filters, heat insulating materials (i.e. bricks, boards, pipes,etc.), sound absorbers, building materials and catalyst supports.

BACKGROUND OF THE INVENTION

Bulk shapes are commonly made by mixing ceramic components (i.e. powder, aggregates, etc.) with organic and inorganic binders. This mixture is then formed into bulk shaped articles by a variety of methods including, but not limited to, casting or pressing. The formed product is then dried and then heated to remove the binding material. Sintering is typically the final step in this process. Organic foams are commonly made by introducing a blowing agent (e.g. a supercritical fluid such as $CO_2$ or Freon) into a polymer. The polymer is subjected to a rapid pressure drop which causes the blowing agent to form bubbles in the polymer. This process creates a solid containing gas bubbles, namely, a foam.

Ceramic foams may be constructed from a variety of materials and may be used in various applications such as separation processes and catalytic process. In simplified terms, a ceramic foam is a foam where the solid phase is composed of a ceramic material.

One of the most common methods of producing a ceramic foam involves the impregnation of an organic polymer foam (e.g., polyurethane) with a ceramic slurry. The coated organic polymer is dried, and the organic phase then burned off. After a sintering step, the resulting ceramic foam is a replica of the original organic precursor.

Another method of producing a ceramic foam, named high internal phase emulsion ("HIPE") involves the preparation of a concentrated emulsion containing a continuous phase of a polymerizing monomer (e.g., sodium silicate) that is dispersed in a pore-forming phase (e.g., petroleum spirit) with the aid of a surfactant. The continuous phase is stabilized by polymerization, washed, and then dried to obtain the foam.

Both of the methods described above produce open-cell ceramic foams. However, these methods do not use the combination of a gas and a liquid phase that is used in blowing-agent foam production methods.

Cellular silica and SiC-whisker-reinforced cellular silica have been produced using physical blowing agents incorporated into a ceramic suspension. (see Fujiu et al., J. Am. Ceram. Soc., vol. 73, pp. 85–90 (1990) and Wu et al, J. Am. Ceram. Soc., vol. 73, pp. 3497–3499 (1990), respectively). This process uses a stabilized aqueous suspension of colloidal silica. The blowing agent is dispersed as small liquid droplets in the suspension with the aid of a surfactant and methanol. The pH of the suspension is adjusted to cause gelation, which is accompanied with a rapid viscosity increase. At this stage, the temperature is raised above the boiling point of the blowing agent thereby producing bubbles in the gel and giving rise to the foam. The duration of the viscosity increase and the setting temperature must be carefully monitored at this stage in order to prevent foam collapse.

In another ceramic foam process (P. Sepulveda, Am. Cer. Soc. Bull., 76, 61–65 (1997)), the foam structure is stabilized by the polymerization of organic monomers incorporated into to the ceramic powder suspension. Initiator and catalyst are added to the system after the foaming stage to induce the polymerization of the organic monomer and the setting of the porous structure.

The above methods have several drawbacks. Most of these methods involve a series of steps (e.g., forming the starting compound, adding blowing agents, etc.). This complicates and increases the cost of the foam manufacturing process. Furthermore, the foams produced thus far often have a 70–90% porosity. Accordingly, a need exists for an improved method of producing ceramic foams, with the option of increasing the pore fraction.

In our previous patent application, U.S. Ser. No. 09/647,211 filed on Sep. 28, 2000, a new process for foaming ceramic foams is disclosed. The disclosure of that application is expressly incorporated herein by reference. In that application, the ceramic foams are produced from a precursor that has an internal blowing mechanism which is activated during gelation. The precursor or mixture of precursors contains at least one ceramic-forming element and liberates at least one volatile reaction product during an inorganic gelation process.

In one embodiment, foaming is based on a precursor containing crystals of the $AlCl_3(Pr^i{}_2O)$ complex. The decomposition of the initial precursor produces polymerizing species dissolved in liquid isopropyl chloride. As long as the solvent and growing $AlO_xCl_y(OPr^i)_2$ species are mixed homogeneously, the boiling point of the solution is raised above the boiling point of the pure isopropyl chloride (35.4° C. at 1 atm). Polymerization takes place in the liquid until a critical polymer size is attained, whereupon a phase separation into a polymer rich and solvent rich regions occurs. Since the expelled solvent is suddenly above its boiling point, bubbles start forming instantly. Foam stabilization takes place as a result of gelation in the polymer rich regions which comprise the cell walls in the foam. The net result of the process is then a gelled ultra light foam.

Acceleration of the process is achieved by heating of the precursor above room temperature, but foaming can also take place at room temperature. The heating and pressurizing also affects the cell size, with larger cells produced at lower temperatures and lower pressures. The simplicity of the process is due to the precursor which contains all the necessary foaming functions.

In another embodiment, the mixture of precursors consists of aluminum sec-butoxide and silicon tetrachloride in solution. Upon heating, the solution releases a volatile component (sec-butylchloride) while condensation of $AlO_x Si_y Cl_z (OR)_n$ species takes place (—OR is the sec-butoxide oxygen donor). As before, the volatile component serves as the blowing agent that creates a foam during the gelation process.

The internal blowing mechanism activated during inorganic gelation reactions constitutes the major difference between these processes and conventional processes used to make cellular ceramics. In addition, this fact also explains the inherent simplicity of the process, which can start with a single precursor. The foaming, gelling and drying stages take place simultaneously.

In contrast to other processes (e.g., HIPE, foaming of ceramic slurries), no mechanical stirring is required at the liquid phase due to the homogeneous nucleation of the chemical blowing agent in the method of the invention. This enables the convenient production of thick or thin foamed films from the liquid phase and allows simple in situ preparation of monolithic foams in complicated shapes by a one step procedure or the formation of foam particles by spraying. Moreover, the method is simpler than the other methods since it may be self-regulating. Furthermore, the method may produce foams that have significantly higher porosity than conventional cellular ceramics.

In another embodiment, the precursor is placed in a pressure vessel and then the precursor is heated and pressurized to accelerate the transformation of the complex to a solution of isopropyl chloride and partially condensed Al—O—Al species. In addition, foaming and gelation are carried out under pressure; and then the pressure vessel is depressurized. Furthermore, the step of foaming can be triggered by the depressurizing step.

Finally, a method for manufacture of a thermal or acoustic insulator is provided. The method includes the steps of foaming a precursor includes a $AlCl_3(Pr^i_2O)$ complex or crystals thereof, heating the precursor, to accelerate its transformation into a liquid solution, cooling said solution to control the condensation reaction thereby to delay foaming; and spraying the solution on to a surface or into a hot atmosphere.

The step of pressurizing the solution can occur prior to the step of spraying.

The step of spraying includes the spraying onto a hot surface, a cold surface or in a hot atmosphere. The step of spraying may include the forming of foamed particles from the original solution.

SUMMARY OF THE INVENTION

The present invention is directed to the preparation of bulk shaped articles from foamed ceramic particles. One of the basic challenges in such a process is the prevention of binders in general, and of inorganic binders in particular, from entering into the internal particulate volume of the foam particles. This effect can alter the unique properties of the foamed particles, (i.e. density, porosity, special morphology, thermal conductivity, etc.) and be counter effective to the properties of the bulk articles. The thrust of this invention is to enable retention of the unique properties of the foamed particles in the final bulk shaped article.

The present invention relates to a process for the preparation of bulk shaped ceramic articles and the articles prepared by this process. The articles are formed by molding castable and pressable mixtures of ceramic foam particulate material. A possible but not limiting example of inorganic ceramic foam material which can be utilized are materials formed by the liberation of volatile reaction products, during an inorganic gelation process as disclosed in the application, U.S. Ser. No. 09/647,211. Articles which can be obtained from this process include but are not limited to, filters, thermal insulators, acoustic insulation, kiln furniture, ceramic pipes, sound absorbers, building materials and catalyst supports.

DETAILED DESCRIPTION OF THE INVENTION

The present invention relates to a process for the preparation of bulk shaped ceramic article comprising the steps of:

Contacting the ceramic foam particulate material with a hydrophobic material to form impregnated and/or coated ceramic foam with hydrophobic properties.

mixing ceramic binder materials with an appropriate aqueous solution to provide an aqueous suspension of ceramic binder;

mixing the aqueous suspension of ceramic binder with the impregnated and/or coated ceramic foam particulate materials to form a castable or pressable mixture; and casting or pressing the castable or pressable mixture into a mold to form a wet green body. Pressure may be optionally applied to the material in the mold. The wet green body formed in the mold is then removed from the mold (demolding step) and dried to form a dried green body. The dried green body is fired to burn out the organic components and sintered to form a sintered, bulk-shaped ceramic article product. A possible ceramic foam particulate material are those formed by liberation of volatile reaction products during an inorganic gelation process.

An example of hydrophobic materials used in the impregnation step is a solution of an organic acid with a long hydrophobic tail (i.e. stearic acid). An aqueous composition is used to form the ceramic binder suspension can contain various materials in addition to water such as, for example, any appropriate water soluble polymer (i.e. polyvinyl alcohol PVA or polyacrylic acid) which will act as a temporary binder in the green state. The ceramic binder is any material that is stable at high temperature and is compatible with the impregnated and coated ceramic foam particulate material. Useful binder includes, for example, aluminum phosphate and calcium aluminate.

The castable and pressable mixture can be molded for an appropriate time to allow production of the wet green product. The appropriate time period depends on the materials used in making the wet green product and can easily be determined by the artisan. Typical time periods can be, for example, for about 2 to about 24 hours. The casting can be carried out at an appropriate temperature which is also determinable by the artisan but can conveniently be at room temperature. Pressing can be conducted at an appropriate pressure as, for example, 0.4–5.0 kg/cm$^2$ to form a wet green body.

The wet green body can be dried for an appropriate time which is dependent on the materials constituting the green body. The wet green body can be dried for about 2 to 24 hours at approximately 40°–80° C.

After drying, the dried green body is fired and sintered. Sintering can be carried under appropriate sintering conditions. Such sintering conditions are well-known to those working in this art area and can be readily determined based on normal conditions useful for the materials undergoing sintering. Possible but not limiting conditions might require, for example, about 3 to 20 hours at approximately 1000°–1800° C. to form a bulk shape ceramic article product. The density and porosity of the product of sintering is dictated by the nature of the material which is being sintered and by the sintering conditions. The ordinary artisan is fully capable of determining proper conditions useful to obtain a product having a desirable range of density and porosity.

DETAILED DESCRIPTION OF THE DRAWINGS

Figure 1:
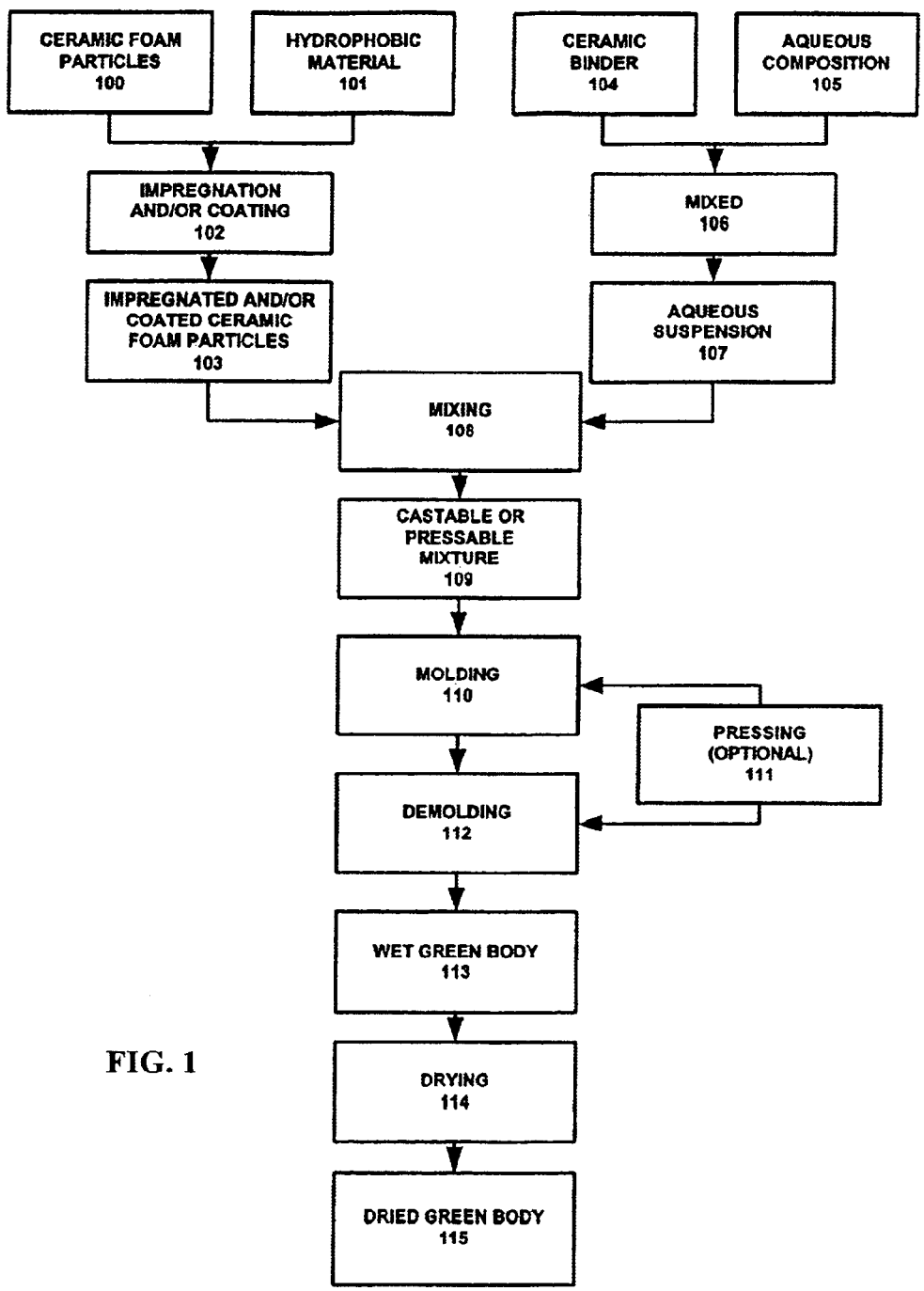
FIGS. 1 and 2 depict a flow chart encompassing the basic steps of the process of the present invention.
Figure 2:
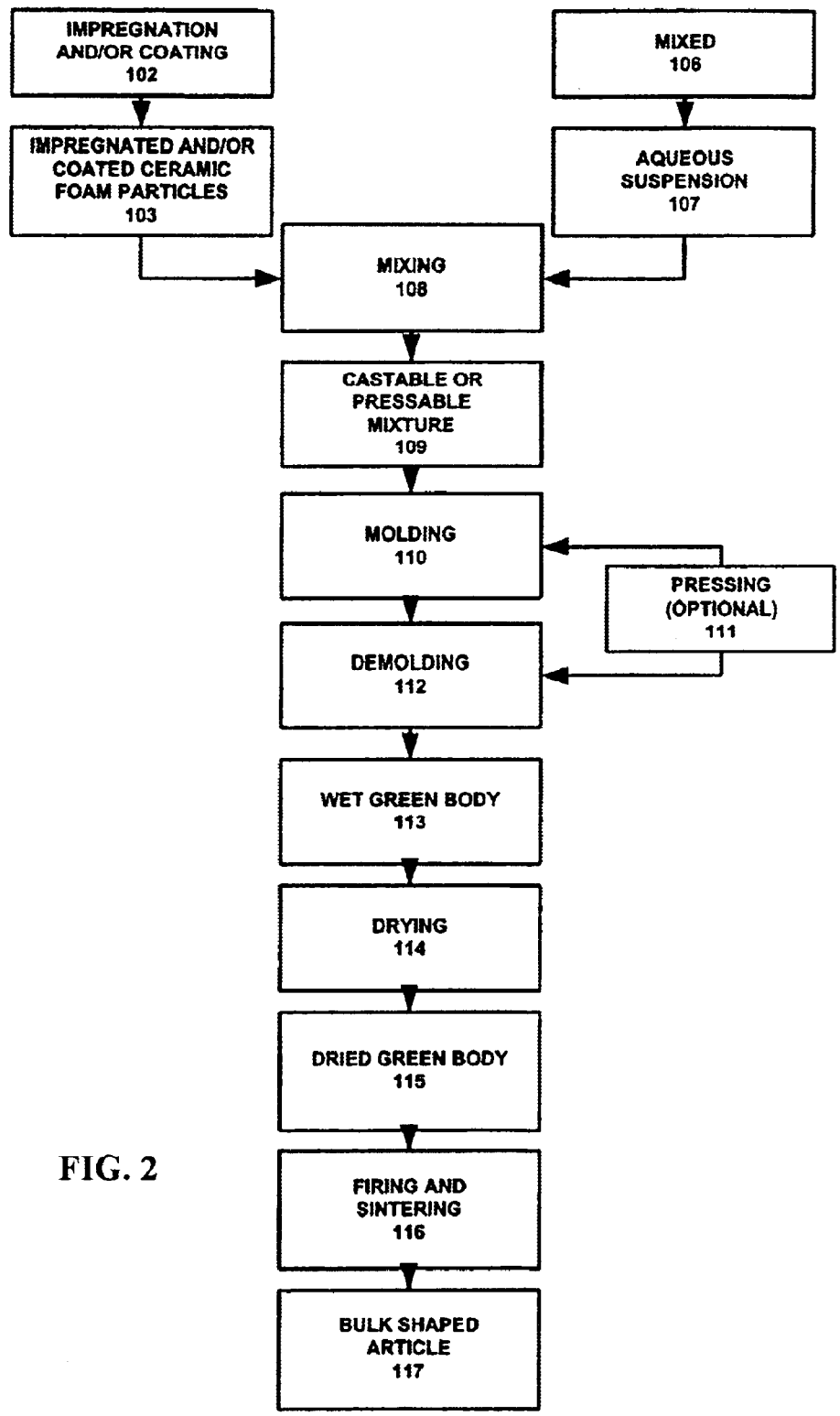

Ceramic foam particulate material (block 100), that can be obtained, for example, by using the method disclosed in application Ser. No. 09/647,211 are provided and the ceramic foam is coated and impregnated with appropriate hydrophobic material (block 101) to produce material an impregnated and/or coated ceramic foam particulate material (block 103).

A ceramic binder (block 104) which can be any appropriate material that is stable at high temperatures and is compatible with the foamed particles (i.e., for example, aluminum phosphate and calcium aluminate). An aqueous composition (block 105), which can be an aqueous composition containing, for example, any appropriate water-soluble polymer (i.e. PVA or polyacrylic acid), is mixed with the ceramic binder (block 106) to yield an aqueous suspension of the binder. (block 107)

The impregnated and coated ceramic foam particulate material (block 103) are mixed with the aqueous composition containing ceramic binder (block 107) preferably in a mixer (block 108) to form a castable and pressable mixture (block 109). The castable mixture can be cast into a mold (block 110) or this material can be pressed, if desired (block 111).

After the molding and optional pressing, the material is removed from the mold (block 112), resulting in a wet green body (block 113). The wet green body can then be dried (block 114) at an appropriate drying temperature which illustratively might be for about 2 to 24 hours at approximately 40°–80° C., yielding a dried green body (block 115). The dried green body is fired and sintered at appropriate firing and sintering conditions such as illustratively at, for example, from about 1000°–1800° C. for about 2 to 20 hours (block 116). The product (block 117) is a sintered bulk material with a density which is dependent upon the starting materials employed and upon the process conditions used to provide the final product. Possible densities might be, for example, in the range of 0.2–0.7 g/cm$^3$. Larger densities can be obtained by using a greater amount of ceramic binder and by increasing the pressure applied to the castable mixture.

While the present invention has been described and illustrated with a preferred method, such description and illustration is not to be construed to be a limitation thereof. Accordingly, the present invention encompasses any variations, modifications and/or alternate embodiments with the scope of the present invention being limited only by the claims which follow.

What is claimed is:

1. A process for the preparation of a bulk shaped ceramic article comprising the steps of:
    a. contacting ceramic foam particulate material with a hydrophobic material to form impregnated and a coated ceramic foam particulate material with hydrophobic properties;
    b. providing an aqueous suspension of a binder for ceramics, with or without an organic binder, and mixing the aqueous suspension with said impregnated and coated ceramic foam particulate material to form a castable and pressable mixture;
    c. casting or pressing said castable and pressable mixture in a mold to form a wet green body;
    d. drying said wet green body to form a dried green body; and
    e. firing and sintering said dried green body to form the bulk shaped ceramic article.

2. The process of claim 1, wherein the ceramic foam particulate material is formed by liberation of volatile reaction products during an inorganic gelation process.

3. The process of claim 1 or claim 2, wherein the ceramic binder is a material that is stable at high temperature and is compatible with the ceramic foam particulate material.

* * * * *